US008275866B2

(12) United States Patent
Klincewicz

(10) Patent No.: US 8,275,866 B2
(45) Date of Patent: Sep. 25, 2012

(54) ASSIGNING TELECOMMUNICATIONS NODES TO COMMUNITY OF INTEREST CLUSTERS

(75) Inventor: John Gregory Klincewicz, Wayside, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 649 days.

(21) Appl. No.: 12/002,826

(22) Filed: Dec. 19, 2007

(65) Prior Publication Data

US 2009/0125620 A1    May 14, 2009

Related U.S. Application Data

(60) Provisional application No. 61/002,936, filed on Nov. 13, 2007.

(51) Int. Cl.
G06F 15/173    (2006.01)
(52) U.S. Cl. .................. 709/223; 709/224; 709/226
(58) Field of Classification Search .................. 709/223, 709/224, 225
See application file for complete search history.

(56) References Cited

U.S. PATENT DOCUMENTS

| 5,832,182 | A | 11/1998 | Zhang et al. | |
|---|---|---|---|---|
| 6,437,804 | B1 * | 8/2002 | Ibe et al. ........................ | 715/736 |
| 7,296,089 | B2 | 11/2007 | Krishnamurthy et al. | |
| 7,298,716 | B2 | 11/2007 | Abraham et al. | |
| 2002/0126622 | A1 * | 9/2002 | Kimball et al. ............... | 370/235 |
| 2003/0117966 | A1 * | 6/2003 | Chen .............................. | 370/255 |
| 2003/0135724 | A1 * | 7/2003 | Krishnamurthy et al. ..... | 712/245 |
| 2003/0195955 | A1 * | 10/2003 | Cochran et al. ............... | 709/223 |
| 2003/0204625 | A1 * | 10/2003 | Cain ............................... | 709/243 |
| 2004/0003111 | A1 * | 1/2004 | Maeda et al. .................. | 709/237 |
| 2005/0027829 | A1 * | 2/2005 | Mukherjee .................... | 709/220 |
| 2005/0197993 | A1 * | 9/2005 | Korotky ........................ | 706/52 |
| 2006/0039286 | A1 * | 2/2006 | Basu et al. .................... | 370/238 |
| 2006/0087986 | A1 * | 4/2006 | Dube et al. .................... | 370/255 |
| 2006/0248141 | A1 * | 11/2006 | Mukherjee .................... | 709/203 |
| 2006/0290697 | A1 * | 12/2006 | Madden et al. ................ | 345/440 |
| 2007/0286218 | A1 * | 12/2007 | Zhang et al. .................. | 370/401 |
| 2008/0235373 | A1 * | 9/2008 | Haley et al. ................... | 709/224 |
| 2008/0304421 | A1 * | 12/2008 | Ramasubramanian et al. ............................. | 370/251 |

FOREIGN PATENT DOCUMENTS

| JP | 04266188 A * | 9/1992 |
|---|---|---|
| WO | WO 02087172 A1 * | 10/2002 |
| WO | WO 2008035266 A2 * | 3/2008 |

OTHER PUBLICATIONS

Xing et al., Distance Metric Learning, with Application to Clustering with Side-Information., http://www.cs.cmu.edu/~epxing/papers/Old_papers/xing_nips02_metric.pdf.*

(Continued)

*Primary Examiner* — Wing Chan
*Assistant Examiner* — Kostas Katsikis

(57) ABSTRACT

The present invention provides techniques for assigning network nodes to community of interest clusters. A seed point representing a cluster is selected. One or more nodes are added to the cluster based on each node's geographic proximity to the selected seed point. Nodes that are adjacent to the cluster are identified and a clustering metric is computed that is representative of the affinity that each identified adjacent node has for the cluster. One or more of the identified nodes are added to the cluster when the clustering metric for the one or more identified nodes exceeds a predetermined value.

18 Claims, 3 Drawing Sheets

OTHER PUBLICATIONS

Jain et al., Data clustering: a review., ACM Computing Surveys (CSUR), vol. 31, Issue 3., Association for Computing Machinery, Inc., Sep. 1999.*

Liu et al., "Improved Approach of Seed Point Selection in RPCCL Algorithm for Aerial Remote Sensing Hyper-spectral Data Clustering with Data Dimensionality Reduction," Software Engineering, Artificial Intelligence, Networking, and Parallel/Distributed Computing, 2007. SNPD 2007. Eighth ACIS International Conference on, vol. 1, no., pp. 860-865, July.*

D.Sana, et al., "Design of Hierarchical Communication Networks Under Node/Link Failure Contraints", Computer Communications 18 (1995), 378-383.

M. Gawande, et al., "Design of SONET Ring Networks for Local Access", Advances in Performance Analysis 2, (1999), 159-173.

N. Aubry, et al., "A Two-Step Clustering Method Applied to Telecommunications Network Planning", 3rd Int'l Conf. on Telecommun. Syst. Modeling & Analysis, (1995), 264-272.

L. Kleinrock, et al., "Optimal Clustering Structures for Hierarchical Topological Design of Large Computer Networks", Networks 10, (1980), 221-248.

J.G. Klincewicz, et al., "Designing Tributary Networks with Multiple Ring Families", Computers and Operations Research 25, (1998), 1145-1157.

Gawande, et al., "Self-Healing Ring Design for Optical Networks", SPIE vol. 4523: Proc. of the SPIE Conf. on Internet Perf. & Control of Network Syst 11, (2001), 284-290.

M. Laguna, "Clustering for the Design of SONET Rings in Interoffice Telecommunications", Management Science 40, (1994), 1533-1541.

K. Park, et al., "Telecommunication Node Clustering with Node Compatibility and Network Survivability Requirements", Management Science 46, (2002) 363-374.

B.W. Kernighan, et al., "An Efficient Heuristic Procedure for Partitioning Graphs", Bell System Technical Journal 49, (1970), 291-307.

Y-L Chen, et al., "An Overlapping Cluster Algorithm to Provide Non-Exhaustive Clustering", European Journal of Operational Research 173, (2006), 762-780.

T. Flanagan, "Fiber Network Survivability", IEEE Communications Magazine, (Jun. 1990) 46-53.

* cited by examiner

ASSIGNING TELECOMMUNICATIONS NODES TO COMMUNITY OF INTEREST CLUSTERS

This application claims the benefit of U.S. Provisional Patent Application No. 61/002,936, filed Nov. 13, 2007, the entire disclosure of which is incorporated by reference herein.

BACKGROUND OF THE INVENTION

This application relates generally to computer networks, and more particularly, to assigning telecommunications nodes to community of interest clusters ("CICs").

Telecommunications networks continue to experience steady growth in demand for a broad range of voice, data and broadband services. Not only must telecommunications service providers respond to increases in the overall volume of traffic, but they must also respond to customer requirements for ever-higher bandwidth connections. This has resulted in larger and more complex networks.

As demand grows, network planners and engineers must continually route new end-to-end connections (e.g., circuits) over the network. This goes beyond finding simple "shortest available path" connections. For example, depending on the restoration requirements for these circuits, it may be necessary to provision capacity over two disjoint paths (to provide "1+1 diversity" for the circuit), or to design and provision the circuit within a Synchronous Optical Networking ("SONET") self-healing ring structure, etc.

As telecommunications networks continue to grow in size and complexity, the need for efficient network planning operations, of all types, has become more critical than ever. A common approach to network planning for very large networks has been to partition the nodes into clusters based on communities of interest clusters ("CICs"). In general, CICs are sub-networks of nodes from a larger network. Currently, network planners and engineers partition nodes into CICs based on judgment, experience and intuition. Ideally, network planners and engineers partition CICs so that a good portion of the overall traffic terminates within the same cluster in which it originated. Thus, with CICs, engineers can focus their attention on the smaller individual clusters, instead of having to work with the much larger overall network.

Some existing telecommunications network design procedures cluster nodes based solely on geographic distances. For example, one method defines the "pull" between a pair of nodes to be the inverse of the distance between the nodes, raised to a power. To create p clusters, this method chooses initial root nodes for each cluster, such that the sum of the "pulls" among the p root nodes is minimized. Other nodes are added sequentially to the clusters based on maximizing this "pull" measure.

Another clustering technique is based on a solution to a version of the p-median problem. In a p-median problem, one chooses p median nodes, and each other node is then "assigned" to its nearest median. The objective is to choose medians so that the sum of the distances from each other node to its assigned median is minimized. The nodes assigned to a particular median form a cluster.

Other approaches utilize some sort of "similarity" metric (also called a "proximity" or "nearness" metric) that is based on both distance and demand. For example, one could use the ratio of demand to distance, or the ratio of demand to distance squared, or even a linear combination of a distance-based metric and a demand-based metric. A variety of such approaches in which nodes or groups of nodes are sequentially joined to each other based on values of a similarity metric have been proposed. Another proposal uses similarity-based approaches of this sort within a hierarchical network design procedure. In the context of ring network design, some have proposed "joining" algorithms that start with each node in a separate cluster and then sequentially merge clusters. This proposal uses similarity-based metrics to identify which mergers should be attempted. Since, in the context of ring design, the cost of a cluster corresponds to the cost of a ring, the cost of the solution before and after the proposed merging can be directly computed.

Other existing network design procedures focus primarily on dividing nodes into clusters so as to maximize the amount of intra-cluster demand. To prevent a solution in which all nodes are assigned to a single, large cluster, constraints that somehow restrict the size of any single cluster are needed. One proposal, for example, uses a Tabu Search procedure, which is a known mathematical optimization method, to cluster nodes. In this proposal, the clusters form rings, with constraints on the maximum amount of demand per ring and nodes per ring. Another proposal solves an integer-programming model using decomposition and column generation. Others have proposed a type of exchange heuristic for a related graph-partitioning problem.

Most clustering applications call for non-overlapping clusters such that each node is assigned to a single cluster. Some techniques allow clusters to overlap; however, they assume the objects being clustered can be described by a vector of attributes, rather than as nodes within a particular network structure that exchange demand.

BRIEF SUMMARY OF THE INVENTION

The techniques mentioned above place too much weight on one or two particular design considerations. It is, therefore, desirable to have a system and method that balances three design considerations: demand, network connectivity, and distance. It is also desirable to have a system and method that automatically partitions network nodes into CICs having a high percentage of intra-cluster demands, that are well connected by network links, and that are relatively compact in a geographic sense.

The present invention provides techniques for assigning network nodes to community of interest clusters. A seed point representing a cluster is selected. One or more nodes are added to the cluster based on each node's geographic proximity to the selected seed point. Nodes that are adjacent to the cluster are identified and a clustering metric is computed that is representative of the affinity that each identified adjacent node has for the cluster. One or more of the identified nodes are added to the cluster. The nodes to be added represent the adjacent nodes that have the largest computed clustering metrics.

These and other advantages of the invention will be apparent to those of ordinary skill in the art by reference to the following detailed description and the accompanying drawings.

DETAILED DESCRIPTION

A system and method for automatically partitioning telecommunications or network nodes into community of interest clusters ("CICs") are disclosed herein. The node clustering system and method yields clusters based on point-to-point demand, network connectivity, and geographic distance. That is, the methodology seeks to design clusters that have a high percentage of intra-cluster demands, that are well connected by network links and that are relatively compact in a geographic sense.

The node clustering system and method can include the following inputs: (1) a list of nodes with their geographical coordinates; (2) a list of links (e.g., fiber cables) including the pair of end nodes that each link connects to and its length in routed miles; (3) a list of demands, including the originating and terminating nodes, and the sizes of the circuits; and (4) the desired number of clusters p.

The node clustering method may be implemented as a series of instructions executing on a computer. Such computers executing programs are well known in the art and may be implemented, for example, using conventional processors, memory units, storage devices, computer software, and other components. For example, the node clustering method may be a Windows application executing on a desktop or laptop computer.

Figure 1:
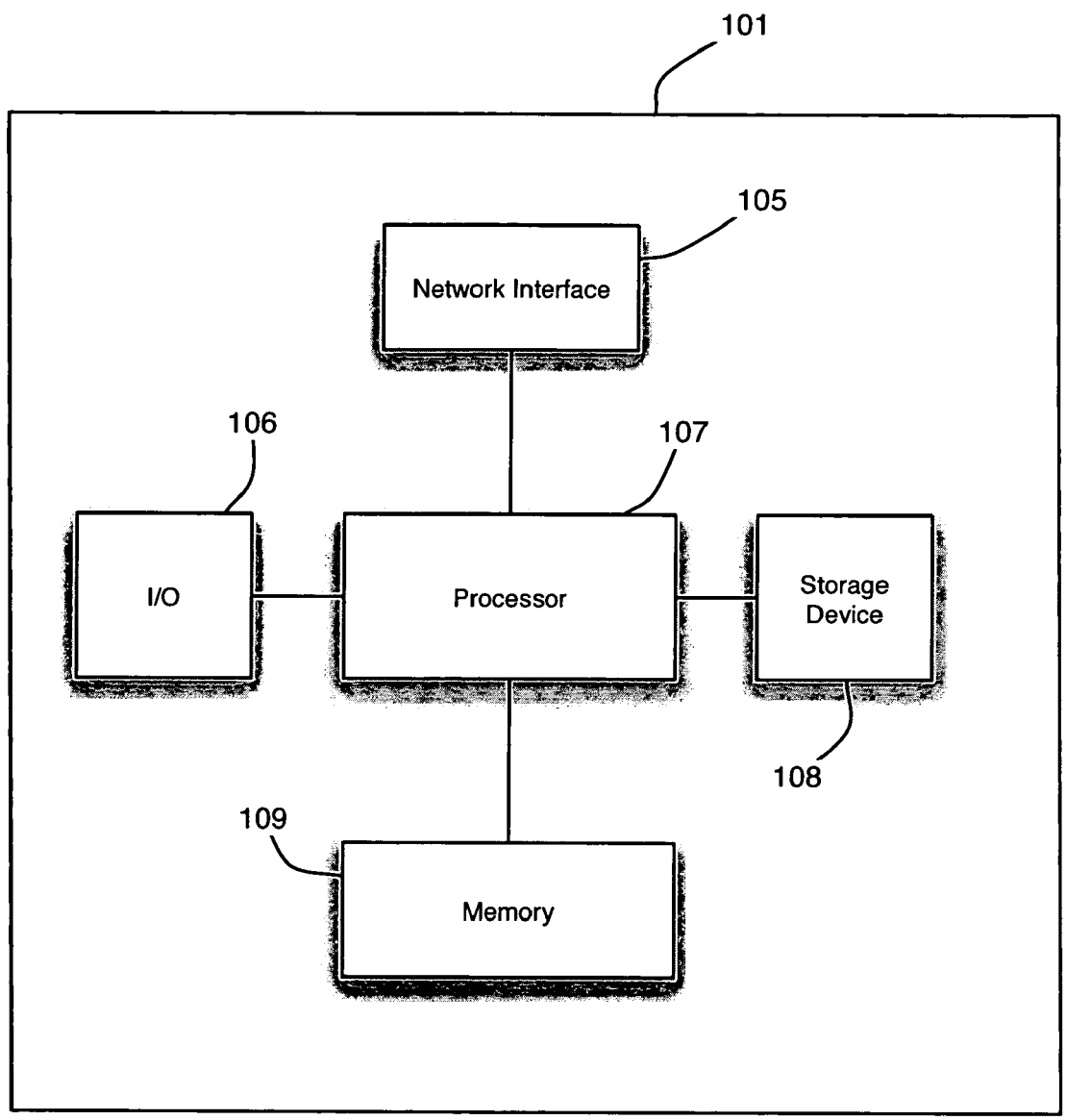
FIG. 1 is a high level block diagram of an exemplary computer system suitable for executing a method for partitioning telecommunications nodes into community of interest clusters.
Figure 2:
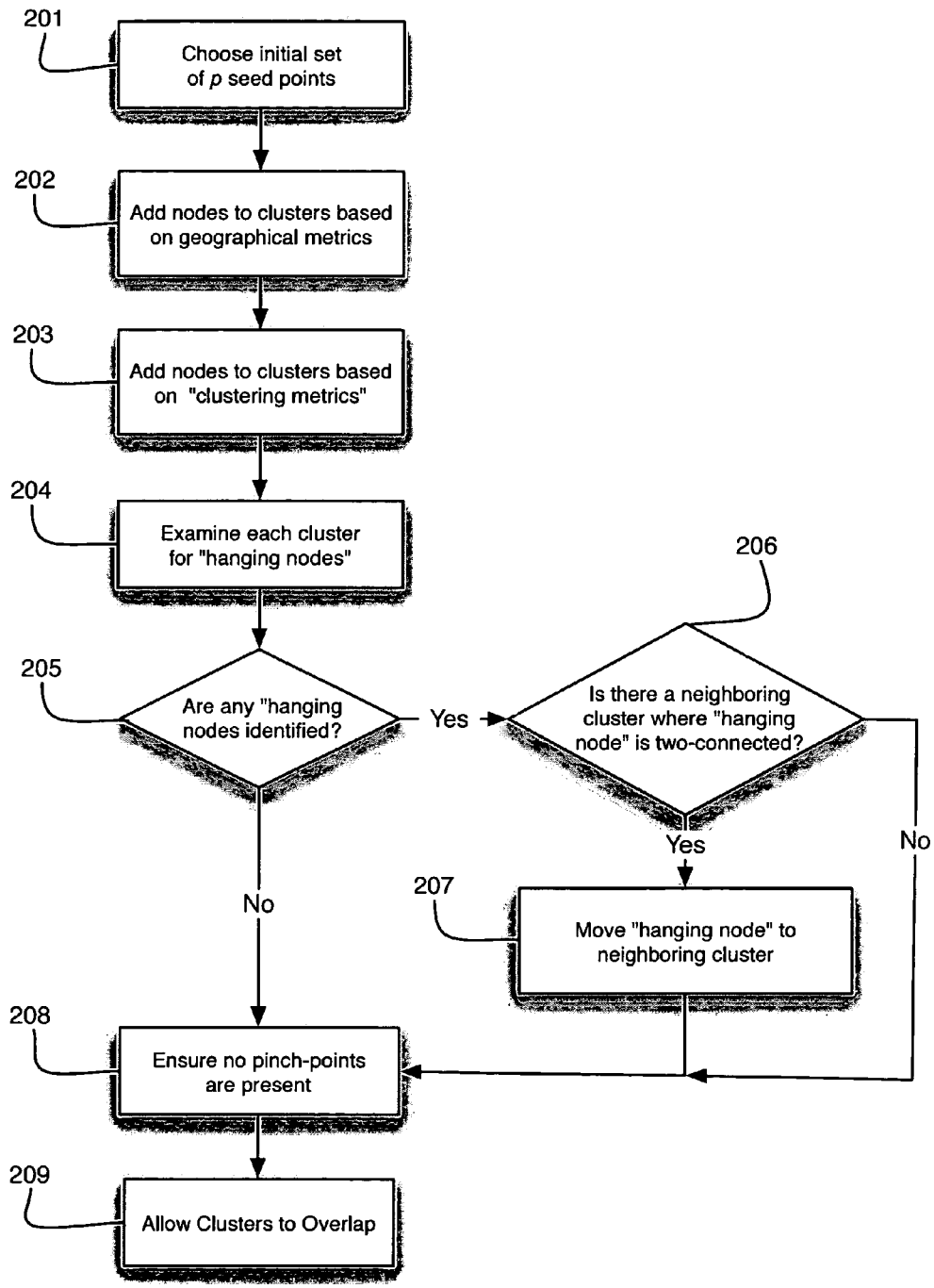
FIG. 2 is a flow chart illustrating a main sequence of steps for partitioning telecommunications nodes to community of interest clusters.
Figure 3:
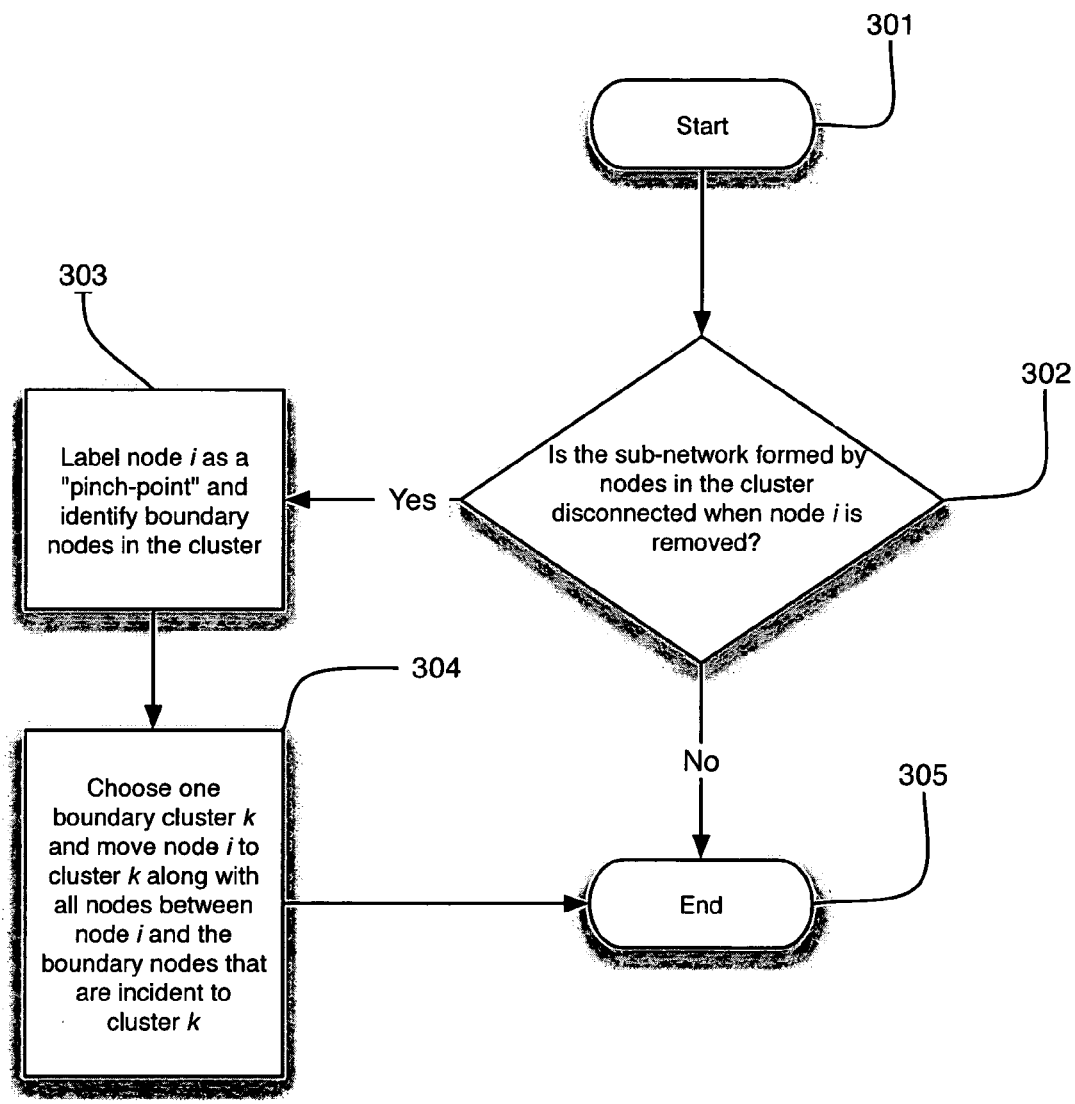
FIG. 3 is a flow chart illustrating a branching sequence of steps for ensuring no pinch-points are present in each cluster.

FIG. 1 is a high level block diagram of an exemplary computer system suitable for executing the node clustering method illustrated in FIGS. 2 & 3. Computer 101 includes a processor 107 (e.g., a central processing unit ("CPU")) that controls the overall operation of computer 101 by executing computer program instructions defining such operation. The computer program instructions may be stored in a storage device 108 (e.g., tape drive, floppy drive, hard disk drive, compact disk drive, etc.) or any other computer-readable medium, and loaded into memory 109 (e.g., random access memory ("RAM") and/or read only memory ("ROM")) when execution of the computer program instructions is desired. Thus, in one embodiment, the node clustering method comprises computer program instructions stored in memory 109 and/or storage device 108, and executed by processor 107. Computer 101 also includes one or more network interfaces 105 for communicating with other devices via a network. Computer 101 may also include input/output devices 106, which represent devices allowing for user interaction with computer 101 (e.g., display, keyboard, mouse, speakers, buttons, etc.). One skilled in the art will recognize that an implementation of an actual computer may contain additional components and that FIG. 1 is an illustrative high level representation of some of the components of such a computer.

FIG. 2 is a flow chart illustrating the steps in accordance with one embodiment. In step 201, an initial set of p seed points are chosen. A seed point is a network node that is representative of an individual cluster. In choosing these initial seed points, the node clustering system and method first focuses on geographic considerations to identify a "general neighborhood" in which to position each cluster. The first two initial seed points are chosen so that the points are as far apart from each other as possible, where distance is measured as shortest path through the network between the two seed points. Each successive initial seed point is chosen so as to maximize the minimum distance to the previously chosen seed points. An iterative exchange heuristic then modifies this initial set of seed points. During each iteration, each seed point is considered in turn. A seed point is replaced with another nearby node if that other node would be a better "median" node (i.e., if the sum of the shortest-path distances between each other node and its nearest seed point is reduced).

Initially, each cluster consists of one of the seed points. In step 202, each cluster is expanded by adding new nodes to each cluster based on geographical metrics. Then, for each cluster, nodes that are close to the seed point, relative to other seed points, are added to the cluster. Specifically, for each node, its closest and second-closest seed points are computed. A node is included in a cluster with its closest seed point if the distance between the node and that closest seed point is less than α times the distance between its closest and second-closest seed point. Here, α can be any number between 0 and 1, but is typically 0.25.

In step 203, more nodes are added to each cluster using "clustering metrics." Throughout the node clustering process, each cluster consists of a connected set of nodes. In this step, the clusters are "expanded" or "grow" one node at a time. Here, demand considerations play a much more significant role in clustering decisions. First, nodes that are "adjacent" to each cluster (i.e., nodes that are not in the cluster, but are incident to a link that has its other endpoint in the cluster) are identified.

A "clustering metric" that attempts to measure the "affinity" that each adjacent node has for the cluster is then computed. The clustering metric may be based on Terminating Demand, Via Demand, Network Connectivity and Distance. Terminating Demand is the amount of demand originating at nodes in the cluster and terminating on the node. Via Demand is the amount of demand originating at nodes in the cluster, whose shortest-path route passes through the node. Network Connectivity is the number of links connecting the node to other nodes already in the cluster. Adding adjacent nodes with multiple link connections to the cluster gives engineers flexibility in finding multiple paths within the cluster. Distance is the length of the shortest path from the node to the cluster seed point.

Nodes with large "clustering metrics" are then added sequentially to their adjacent clusters. One possible implementation would be to order all the "adjacent" nodes in a list according to decreasing size of their clustering metric. Nodes are then taken sequentially from the top of the list and added to their respective clusters. This stops when adding the next node from the list would result in some cluster receiving more than one node during this iteration. When one stops adding nodes from the list, the clustering metrics are recomputed and the process is repeated, until every node is in some cluster. Because of the emphasis in this step on Terminating Demand, Via Demand and Network Connectivity, the clusters tend to grow "in the direction of the demand."

For each cluster k, a clustering metric is computed for each node i that is adjacent to cluster k. The clustering metric can be computed as described below.

A Distance component is computed for the clustering metric. Let $d_{ik}$ denote the distance between node i and the seed point for cluster k and let $A_k$ denote the set of nodes adjacent to cluster k. Then, let $$d_{min}^k = \min_{i \in A_k} \{d_{ik}\}$$

denote the minimum distance to the seed point, among all nodes i that are adjacent to cluster k, and $$d_{max}^k = \max_{i \in A_k}\{d_{ik}\}$$

denote the maximum distance to the seed point, among all nodes i that are adjacent to cluster k. The Distance component for node i and cluster k is computed as:

$$M_{ik}^d = \frac{(d_{max}^k - d_{ik})}{(d_{max}^k - d_{min}^k)}.$$

(If $d_{max}^k = d_{min}^k$, the Distance component is set to $M_{ik}^d = 1$.) The way that the metric is defined, $0 < M_{ik}^d < 1$; the larger the metric, the closer the node is to the seed point.

A Terminating Demand component for the clustering metric is calculated as follows. Let $t_i^k$ denote the traffic (in mbps) that originates in cluster k and that terminates on node i. Let $$t_{max}^k = \max_{j \in A_k}\{t_i^k\}$$

denote the maximum amount of such terminating demand among all nodes i that are adjacent to cluster k. The Terminating Demand component for node i and cluster k is defined as:

$$M_{ik}^t = \frac{t_i^k}{t_{max}^k}.$$

Thus, $0 < M_{ik}^t < 1$; the larger the metric, the more demand from cluster k terminates on node i.

A Via Demand component for the clustering metric is computed as follows. Let $v_i^k$ denote the traffic (in mbps) that originates in cluster k and whose shortest-path route passes through node i (call this "via" demand). Let $$v_{max}^k = \max_{i}\{v_i^k\}$$

denote the maximum amount of such via demand among all nodes i that are adjacent to cluster k. The Via Demand component for node i and cluster k is defined as:

$$M_{ik}^v = \frac{v_i^k}{v_{max}^k}.$$

Thus, $0 < M_{ik}^v < 1$; the larger the metric, the more Via Demand from cluster k passes through node i.

A Network Connectivity component for the clustering metric is computed as follows. Let $n_i^k$ denote the number of links that directly connect node i to nodes currently in cluster k. Let $$n_{max}^k = \max_{i}\{n_i^k\}$$

denote the maximum number of such links among all nodes i that are adjacent to cluster k. The Network Connectivity component for the clustering metric for node i and cluster k is defined as:

$$M_{ik}^n = \frac{n_i^k}{n_{max}^k}.$$

Thus, $0 < M_{ik}^n < 1$; the larger the metric, the more links that connect node i to cluster k.

The clustering metric is then computed as follows. The clustering metric that measures the affinity of node i for cluster k is given by:

$$M_{ik} = \lambda_d M_{ik}^d + \lambda_t M_{ik}^t + \lambda_v M_{ik}^v + \lambda_n M_{ik}^n,$$

where $\lambda_d, \lambda_t, \lambda_v, \lambda_n$ are weights greater than 0. The larger the clustering metric, the more desirable it is to assign node i to cluster k. For example, values of $\lambda_d = 1, \lambda_t = 1, \lambda_v = 0.5$ and $\lambda_n = 1$ have been successfully used in computing the clustering metric. Less weight was assigned to the Via Demand, since, when traffic is actually routed, it will not necessarily use the shortest path and, hence, might not actually pass through node i. Nonetheless, this metric component helps to identify nodes "in the direction of the traffic" and, thus, helps to extend the cluster toward nodes where the traffic will terminate.

Once nodes with large clustering metrics are added sequentially to their adjacent clusters in step 203, each cluster is examined in step 204 for "hanging nodes" (i.e., a node that is connected to only one other node in the cluster). If a hanging node is found in step 205, then the node clustering system and method attempts to identify a neighboring cluster to which the hanging node would be two-connected in step 206. If such a cluster is found, then the hanging node is moved to that neighboring cluster in step 207. If no hanging node is identified in step 205 or if an identified hanging node is moved to a neighboring cluster in step 207, then the system and method proceeds to step 208.

In step 208, the node clustering system and method ensures that there are no "pinch-points" present in a given cluster. A "pinch-point" is a node that, when disconnected, isolates a sub-network from the rest of the cluster. This process is conducted for each cluster on a node-by-node basis.

FIG. 3 illustrates the sequence of steps performed by the system and method to ensure that no pinch-points are present in step 208. The node clustering system and method looks at each node i in each cluster k to determine whether the node i is a pinch-point. For each node i in cluster k, this process commences in step 301. In step 302, the system and method examines the sub-network formed by the nodes in the particular cluster k and the links that interconnect them, and determines whether the sub-network is disconnected when the node i is removed. One way to test for such pinch-points is to assign an "infinite" cost to links incident to node i. If there exist pairs of nodes within the cluster such that the shortest path between the pair of nodes has infinite cost, then the cluster is disconnected when node i is removed. If so, then node i is considered a pinch-point and the process continues in step 303. Otherwise, the process for ensuring that node i is not a pinch-point ends in step 305, and the process would be repeated for each of the remaining nodes in each of the clusters.

If node i is determined to be a pinch-point in step 302, then the node clustering system and method labels node i as a pinch-point and identifies "boundary nodes" in the cluster in step 303. Boundary nodes are nodes that are incident to a link whose other endpoint is in another cluster, which would then be considered a "boundary cluster." Then, in step 304, the node clustering system and method chooses one boundary cluster k, and moves node i to cluster k, along with all nodes that are between node i and the boundary nodes that are incident to cluster k. Cluster k is chosen as the boundary cluster if it results in the fewest nodes being moved. After the node is moved to the boundary cluster in step 304, the process in steps 301-304 are repeated for the remaining nodes in the cluster from which the node was moved. Similarly, the boundary cluster k that received the moved nodes must also be checked for pinch-points by repeating the steps 301-305 for each node in that boundary cluster k. To the extent that the same group of nodes are moved back and forth between neighboring clusters (e.g., if the same node appears as a pinch-point more than once), then a new cluster should be created. Then, the "moved" nodes are moved to the new cluster, rather than to the boundary cluster k.

Referring back to FIG. 2, once all nodes are assigned to a cluster, the node clustering system and method looks for opportunities to "overlap" the clusters in step 209. Specifically, the node clustering system and method examines links that have one end node in one cluster and the other end node in another cluster. For each of these end nodes, the node clustering system and method considers the amount of traffic that originates at that end node and terminates on the opposite cluster. If the amount of this traffic is "large enough," then it is appropriate for the clusters to overlap.

Specifically, for each proposed overlap, the node clustering system and method compares the percentage increase in intra-cluster traffic against the percentage increase in the sum of all pairwise distances among nodes in the clusters. If the percentage increase in intra-cluster traffic is greater, then the node clustering system and method allows the clusters to overlap, by assigning one or both of the end nodes to also be in the opposite cluster. Before assigning a node to an additional cluster, the node clustering system and method makes sure that the node is connected to at least two other nodes in that cluster.

Some pre-processing steps can be executed before the node clustering method is initiated. Exemplary pre-processing steps include, but are not limited to:

Aggregating parallel links between the same pair of nodes.

Collapsing any "linear chains" in the network (e.g., a "string" of nodes of degree two, with a node of degree one at the end) to the root node at the base of the chain, in order to increase the degree of each network node to two or more. All nodes on a linear chain will be assigned to the same cluster as the root node. During the node clustering process, all demands to/from nodes on the chain will instead be associated with the root node. Demands that both begin and end on the same chain can be ignored during clustering.

For each pair of nodes, the shortest path distance through the network can be computed and stored. The distance on a link corresponds to the "length" of the link in routed miles (provided as input).

The node clustering process can be repeated multiple times, by each time choosing a different set of initial seed points and/or by varying the target number of clusters. "Marking" nodes already chosen to be an initial seed point in a prior iteration, and then eliminating "marked" nodes from consideration when choosing the initial set is one way that this can be implemented. Once the node clustering system and method has generated suggested solutions, network planners and engineers can then choose among the clustering solutions found during the multiple iterations and/or apply their experience and judgment to modify that solution by adjusting cluster boundaries as desired. Combining the speed and computational capabilities of the computerized node clustering process with the knowledge and intuition of network planners and engineers in this way can result in improved cluster designs being created in less time.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A method for assigning network nodes to community of interest clusters comprising:

selecting two seed points in a network by a computing device comprising a processor, each seed point representing a cluster, wherein the two seed points are selected so that the two seed points are as far apart from each other as possible via a network path selected from a plurality of network paths, wherein a network path distance between the two seed points is measured as a shortest path through the network between the two seed points selected from a plurality of network paths between the two seed points;

adding a node to a particular cluster based on each node's geographic proximity to a selected seed point associated with the particular cluster;

identifying nodes that are adjacent to the particular cluster to generate identified nodes;

computing a clustering metric representative of an affinity that each identified node has for the particular cluster, the clustering metric based on demand, network connectivity, and distance, the clustering metric comprising one of a distance component, a terminating demand component, a via demand component, and a network connectivity component; and adding one of the identified nodes to the particular cluster when the clustering metric for the one of the identified nodes exceeds a predetermined value;

wherein the distance component is represented by an equation $$M_{ik}^d = \frac{(d_{max}^k - d_{ik})}{(d_{max}^k - d_{min}^k)}$$

where $M_{ik}^d$ denotes the distance component, $d_{ik}$ denotes a distance between node i and a seed point associated with the particular cluster; $d_{min}$ denotes a minimum distance to the seed point associated with the particular cluster among all of the identified nodes, and $d_{max}$ denotes a maximum distance to the seed point associated with the particular cluster among all of the identified nodes.

2. The method according to claim 1, wherein the terminating demand component is represented by an equation $$M_{ik}^t = \frac{t_i^k}{t_{max}^k}$$

where $M_{ik}^t$ denotes the terminating demand component, $t_i$ denotes traffic that originates in the particular cluster and terminates on node i, and $t_{max}$ denotes a maximum amount of terminating demand among all of the identified nodes.

3. The method according to claim 1, wherein the via demand component is represented by an equation $$M_{ik}^v = \frac{v_i^k}{v_{max}^k}$$

where $M_{ik}^v$ denotes the via demand component, $v_i$ denotes traffic that originates in the particular cluster and whose shortest path route passes through node i, and $v_{max}$ denotes a maximum amount of via demand among all of the identified nodes.

4. The method according to claim 1, wherein the network connectivity component is represented by an equation $$M_{ik}^n = \frac{n_i^k}{n_{max}^k}$$

where $M_{ik}^n$ denotes the network connectivity component, $n_i$ denotes a number of links that directly connect node i to nodes in the particular cluster, and $n_{max}$ denotes a maximum number of links among all of the identified nodes to nodes in the particular cluster.

5. The method according to claim 1, further comprising identifying any hanging nodes in the particular cluster, and moving any identified hanging nodes to a neighboring cluster.

6. The method according to claim 1, further comprising:
identifying a particular node in the particular cluster as a pinch-point if a sub-network formed by nodes in the particular cluster would be disconnected if the particular node were removed from the sub-network;
identifying boundary nodes in the particular cluster if a particular node is determined to be a pinch-point;
selecting a boundary cluster based on the boundary nodes, to generate a selected boundary cluster; and
moving the particular node identified as a pinch-point to the selected boundary cluster.

7. The method according to claim 1, further comprising:
identifying a link having a first end node in the particular cluster and a second end node in a second cluster;
computing an amount of traffic that originates at the first end node and terminates on the second cluster; and
overlapping the particular cluster with the second cluster by assigning one of the first end node and the second end node to the second cluster when the amount of traffic exceeds a predetermined threshold.

8. The method according to claim 1, wherein a node is added to the particular cluster based on that node's geographic proximity to the seed point associated with the particular cluster when a distance between the node and a seed point associated with the particular cluster is less than a predefined multiple of a distance between the node and another seed point.

9. A non-transitory computer-readable medium storing computer program instructions for assigning network nodes to community of interest clusters, which, when executed on a processor, cause the processor to perform a method comprising:
selecting two seed points in a network by a computing device comprising a processor, each seed point representing a cluster, wherein the two seed points are selected so that the two seed points are as far apart from each other as possible via a network path selected from a plurality of network paths, wherein a network path distance between the two seed points is measured as a shortest path through the network between the two seed points selected from a plurality of network paths between the two seed points;
adding a node to a particular cluster based on each node's geographic proximity to a selected seed point associated with the particular cluster;
identifying nodes that are adjacent to the particular cluster to generate identified nodes;
computing a clustering metric representative of an affinity that each identified node has for the particular cluster, the clustering metric based on demand, network connectivity, and distance; and
adding one of the identified nodes to the particular cluster when the clustering metric for the one of the identified nodes exceeds a predetermined value;
wherein the clustering metric includes a distance component represented by an equation $$M_{ik}^d = \frac{(d_{max}^k - d_{ik})}{(d_{max}^k - d_{min}^k)}$$

where $M_{ik}^d$ denotes the distance component, $d_{ik}$ denotes a distance between node i and a seed point associated with the particular cluster; $d_{min}$ denotes a minimum distance to the seed point associated with the particular cluster among all of the identified nodes, and $d_{max}$ denotes a maximum distance to the seed point associated with the particular cluster among all of the identified nodes.

10. The computer-readable medium according to claim 9, wherein the clustering metric includes a terminating demand component represented by an equation $$M_{ik}^t = \frac{t_i^k}{t_{max}^k}$$

where $M_{ik}^t$ denotes the terminating demand component, $t_i$ denotes traffic that originates in the particular cluster and terminates on node i, and $t_{max}$ denotes a maximum amount of terminating demand among all of the identified nodes.

11. The computer-readable medium according to claim 9, wherein the clustering metric includes a via demand component represented by an equation $$M_{ik}^v = \frac{v_i^k}{v_{max}^k}$$

where $M_{ik}^v$ denotes the via demand component, $v_i$ denotes traffic that originates in the particular cluster and whose shortest path route passes through node i, and $v_{max}$ denotes a maximum amount of via demand among all of the identified nodes.

12. The computer-readable medium according to claim 9, wherein the clustering metric includes a network connectivity component represented by an equation $$M_{ik}^n = \frac{n_i^k}{n_{max}^k}$$

where $M_{ik}^n$ denotes the network connectivity component, $n_i$ denotes a number of links that directly connect node i to nodes in the particular cluster, and $n_{max}$ denotes a maximum number of links among all of the identified nodes to nodes in the particular cluster.

13. The computer-readable medium according to claim 9, wherein a node is added to the particular cluster based on that node's geographic proximity to the seed point associated with the particular cluster when a distance between the node and the seed point associated with the particular cluster is less than a predefined multiple of the distance between the node and another seed point.

14. A system for assigning network nodes to community of interest clusters comprising:
   a computing device comprising a processor;
   means for selecting two seed points in a network, each seed point representing a cluster, wherein the two seed points are selected so that the two seed points are as far apart from each other as possible via a network path selected from a plurality of network paths, wherein a network path distance between the two seed points is measured as a shortest path through the network between the two seed points selected from a plurality of network paths between the two seed points;
   means for adding a node to a particular cluster based on each node's geographic proximity to a selected seed point associated with the particular cluster;
   means for identifying nodes that are adjacent to the particular cluster to generate identified nodes;
   means for computing a clustering metric representative of an affinity that each identified node has for the particular cluster, the clustering metric based on demand, network connectivity, and distance; and
   means for adding one of the identified nodes to the particular cluster when the clustering metric for the one of the identified nodes exceeds a predetermined value;
   wherein the clustering metric includes a distance component represented by an equation $$M_{ik}^d = \frac{(d_{max}^k - d_{ik})}{(d_{max}^k - d_{min}^k)}$$

where $M_{ik}^d$ denotes the distance component, $d_{ik}$ denotes a distance between node i and a seed point associated with the particular cluster; $d_{min}$ denotes a minimum distance to the seed point associated with the particular cluster among all of the identified nodes, and $d_{max}$ denotes a maximum distance to the seed point associated with the particular cluster among all of the identified nodes.

15. The system according to claim 14, wherein the clustering metric includes a terminating demand component represented by an equation $$M_{ik}^t = \frac{t_i^k}{t_{max}^k}$$

where $M_{ik}^t$ denotes the terminating demand component, $t_i$ denotes traffic that originates in the particular cluster and terminates on node i, and $t_{max}$ denotes a maximum amount of terminating demand among all of the identified nodes.

16. The system according to claim 14, wherein the clustering metric includes a via demand component represented by an equation $$M_{ik}^v = \frac{v_i^k}{v_{max}^k}$$

where $M_{ik}^v$ denotes the via demand component, $v_i$ denotes traffic that originates in the particular cluster and whose shortest path route passes through node i, and $v_{max}$ denotes a maximum amount of via demand among all of the identified nodes.

17. The system according to claim 14, wherein the clustering metric includes a network connectivity component represented by an equation $$M_{ik}^n = \frac{n_i^k}{n_{max}^k}$$

where $M_{ik}^n$ denotes the network connectivity component, $n_i$ denotes a number of links that directly connect node i to nodes in the particular cluster, and $n_{max}$ denotes a maximum number of links among all of the identified nodes to nodes in the particular cluster.

18. The system according to claim 14, wherein a node is added to the particular cluster based on that node's geographic proximity to the seed point associated with the particular cluster when a distance between the node and a seed point associated with the particular cluster is less than a predefined multiple of a distance between the node and another seed point.

* * * * *